United States Patent
Weber, Jr.

[11] Patent Number: 6,108,164
[45] Date of Patent: Aug. 22, 2000

[54] LATENT THERMAL VAPORIZATION REDUCTION

[75] Inventor: Gerard V. Weber, Jr., Saugerties, N.Y.

[73] Assignee: International Business Machines Corporation, Armonk, N.Y.

[21] Appl. No.: 09/154,975

[22] Filed: Sep. 17, 1998

[51] Int. Cl.⁷ .................................................. G11B 33/14
[52] U.S. Cl. ........................................................ 360/97.02
[58] Field of Search ........................... 360/97.02, 97.03, 360/97.04; 55/385.6

[56] References Cited

U.S. PATENT DOCUMENTS

| | | | |
|---|---|---|---|
| 3,955,176 | 5/1976 | Andersson | 357/81 |
| 4,488,192 | 12/1984 | Treseder | 360/97.03 |
| 4,488,193 | 12/1984 | Davis et al. | 360/97.03 |
| 4,620,248 | 10/1986 | Gitzendanner | 360/97.02 |
| 4,789,913 | 12/1988 | Gregory et al. | 360/97.03 |
| 5,392,177 | 2/1995 | Chainer et al. | 360/97.02 |
| 5,680,273 | 10/1997 | Wong | 360/97.02 |
| 5,734,521 | 3/1998 | Fukudome et al. | 360/97.03 |
| 5,907,454 | 5/1999 | Ahn | 360/97.03 |
| 5,987,890 | 11/1999 | Chiu et al. | 62/3.2 |

*Primary Examiner*—Jefferson Evans
*Attorney, Agent, or Firm*—Floyd A. Gonzalez

[57] ABSTRACT

A direct access storage device comprises a frame, a rotating magnetic storage structure positioned within the frame generating air flow within the frame, at least one head writing and reading to and from the rotating storage structure, thermally insulating spacers connected to the frame, a condensation plate connected to the thermally insulating spacers and positioned within the frame, a thermal core connected to the condensation plate and extending through the frame, a heat sink connected to the thermal core and positioned outside the frame and an air ram for directing the air flow toward the condensation plate, wherein the condensation plate, the thermal core and the heat sink are thermally insulated from the frame.

34 Claims, 2 Drawing Sheets

LATENT THERMAL VAPORIZATION REDUCTION

BACKGROUND OF THE INVENTION

1. Field of the Invention

The present invention generally relates to a device for reducing organic gas concentrations in a magnetic disk device and more particularly to the use of a heatsink, core and plate for allowing vaporized molecules to condense on the plate, which attracts and contains the vaporized particles.

2. Description of the Related Art

Various lubricants are used in the design of direct access storage devices (DASD). However, such lubricants often cause a condition referred to as "Stiction" in which the read/write head becomes temporarily attached (e.g., "sticks") to the magnetic disk.

Stiction is caused by the latent thermal vaporization of lubricants. More specifically, the lubricants vaporize during operation of the storage device and the vaporized molecules condense on operational surfaces of the storage device and ultimately form droplets. For example, droplets may form in areas of low pressure behind a flying read/write head. Upon powering down, the condensed droplets move in-between the flying head and the magnetic disk. The surface tension between the head and the disk causes the head to stick to the disk, which may damage the disk or head upon a subsequent activation of the storage device or prevent the disk from turning, making the DASD inoperative.

Conventional structures attempt to eliminate vaporized molecules from remaining on magnetic disk devices by providing filter meshes which are cooled to allow the organic gas modules to condense on the filter meshes. Other conventional devices utilize a cooled absorbing layer to allow the vaporized organic molecules to condense upon and be absorbed into the absorbing layer. The absorbed molecules then diffused through the absorbing layer and evaporate outside the direct access storage device.

Conventional structures also utilize external structures such as cooling fins and cooling liquids to cool the surface upon which the vaporized molecules can condense.

However, conventional structures require expensive, elaborate and power consuming cooling mechanisms to keep the filter or condensing plate cooler than the operating environment within the direct access storage device. Further, conventional structures which use passive fins require the addition of passages and other elaborate and expensive structures to permit condensation to occur close to the cooling fins.

SUMMARY OF THE INVENTION

It is, therefore, an object of the present invention to provide a structure and method for reducing latent thermal vaporization through the use of a heatsink, core and plate which is completely insulated from the DASD housing. The core and heatsink transfer heat from the plate and cool the plate which causes vaporized molecules to condense upon the plate rather than upon the operational surface of the storage device.

More specifically, in one embodiment, the invention comprises a direct access storage device having a frame, a rotating magnetic storage structure positioned within the frame generating air flow within the frame, at least one head writing and reading to and from the rotating storage structure, thermally insulating spacers connected to the frame, a condensation plate connected to the spacers and positioned within the frame, a thermal core connected to the condensation plate and extending through the frame, a heat sink connected to the thermal core and positioned outside the frame, and an air ram for directing the air flow toward the condensation plate. The condensation plate, the thermal core and the heat sink are thermally insulated from the frame.

The condensation plate has a temperature lower than that of other structures within the frame, such that contamination particles within the frame condensate on the condensation plate. The contamination particles are prevented from accumulating upon the rotating magnetic storage structure and the at least one head by the condensation plate condensing the contamination particles.

The thermally insulating spacers thermally insulate the condensation plate from the frame. An insulating sealer insulates the thermal core from the frame and prevents contaminates from entering the fame.

The thermally insulating spacers comprise one of resins, plastics, acrylics, glasses and thermally insulating ceramics. The condensation plate, the thermal core and the heat sink comprise thermal conductors. Further, the heat sink includes cooling fins.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1A:
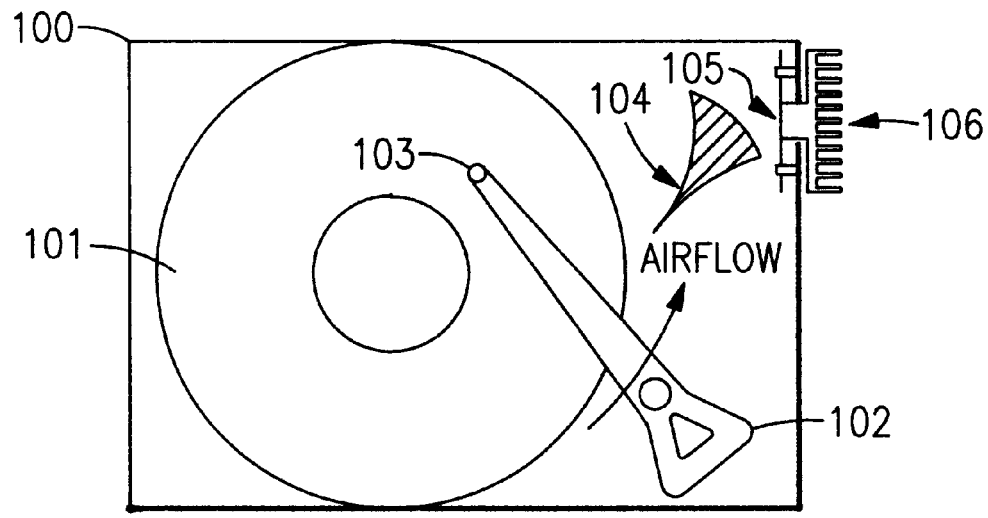
FIG. 1A illustrates a direct access storage device which includes an inventive condensation plate according to the invention.

Referring now to the drawings, and more particularly to FIG. 1A, a first preferred embodiment of the invention is illustrated. More specifically, FIG. 1A illustrates a direct access storage device frame 100 which includes one or more magnetic storage mediums 101, for example in the form of magnetic disks or pallets of magnetic disks, and a voice coil and arm 102 which supports a read/write head 103 which reads and writes to and from the storage medium 101.

The storage medium rotates and creates an air flow within the direct access storage device frame 100 as indicated in FIG. 1A. The air flow is directed toward an air ram 104 such that gases within the direct access storage device, such as air, are directed toward a thermal condensation plate 105. The condensation plate 105 is thermally insulated from the direct access storage device frame 100 and is thermally connected to an external heat transfer device 106, such as a heat sink having fins.

Figures 1B, 1C:
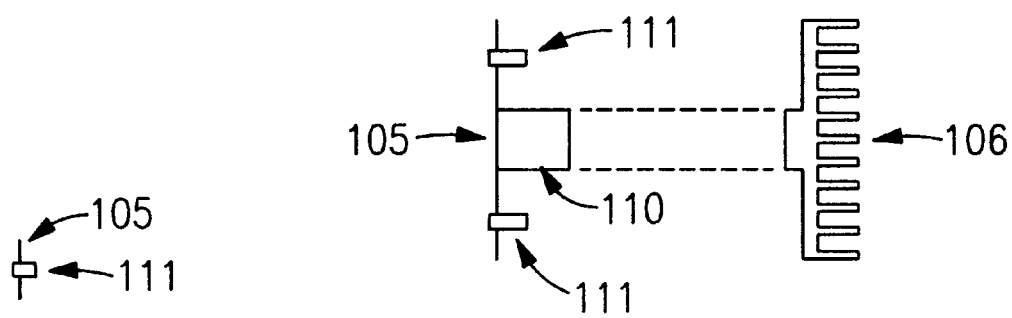
FIGS. 1B–1D illustrate the inventive condensation plate and cooling mechanism in greater detail.

The condensation plate 105 and heat sink 106 structure are illustrated in greater detail in FIG. 1B. More specifically, FIG. 1B illustrates a thermal core 110 which thermally connects the condensation plate 105 to the heat sink 106. The thermal core 110 also provides mechanical support for the heat sink 106 and insures that the heat sink does not contact the frame 100.

The opening in the frame 100 through which the thermal core 110 passes is preferably sealed with a thermal insulator seal (not illustrated for clarity) to prevent contaminates from passing into the direct access storage device. Further, the thermal seal prevents heat transfer from occurring between the thermal core 110 and the frame 100.

Figure 1D:
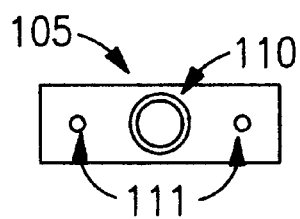

FIG. 1B also illustrates spacers 111 which comprise a thermal insulator which are used to connect the condensation plate 105 to the frame 100. FIG. 1C illustrates the spacers 111 and a portion of the condensation plate 105 in greater detail. FIG. 1D illustrates another view of the condensation plate 105, the spacers 111 and the thermal core 110.

The spacers 111 are the primary physical support contact between the condensation plate/heat sink 105/106 assembly and the direct access storage device frame 100 and the spacers 111 thermally insulate the condensation plate/heat sink 105/106 assembly from the frame 100. While two spacers 111 are illustrated in the drawings, as would be known by one ordinarily skilled in the art given this disclosure, any number of spacers 111 can be utilized to attach the condensation plate 105 to the frame 100.

The condensation plate 105, thermal core 110 and heat transfer device 106 are preferably formed of a materials having a high thermal conductivity, such as aluminum, copper, gold, silver and thermally conductive ceramics. To the contrary, the spacers and insulating seal are preferably formed of materials having a low thermal conductivity, such as resins, plastics, acrylics, glasses and thermally insulating ceramics.

In operation, the heat sink 106 dissipates heat from the condensation plate 105 through the thermal core 110 which causes the condensation plate 105 to be at a lower temperature than other items within the direct access storage device. Therefore, as the air flow is directed towards the condensation plate 105 by the air ram 104 any vaporized particles will condense upon the condensation plate 105 and be prevented from condensing upon other areas or devices within the direct access storage device.

Therefore, with the invention, vaporized particles are prevented from accumulating on areas such as the read/write heads 103 and the phenomenon known as Stiction, described above, is prevented.

Figure 2A:
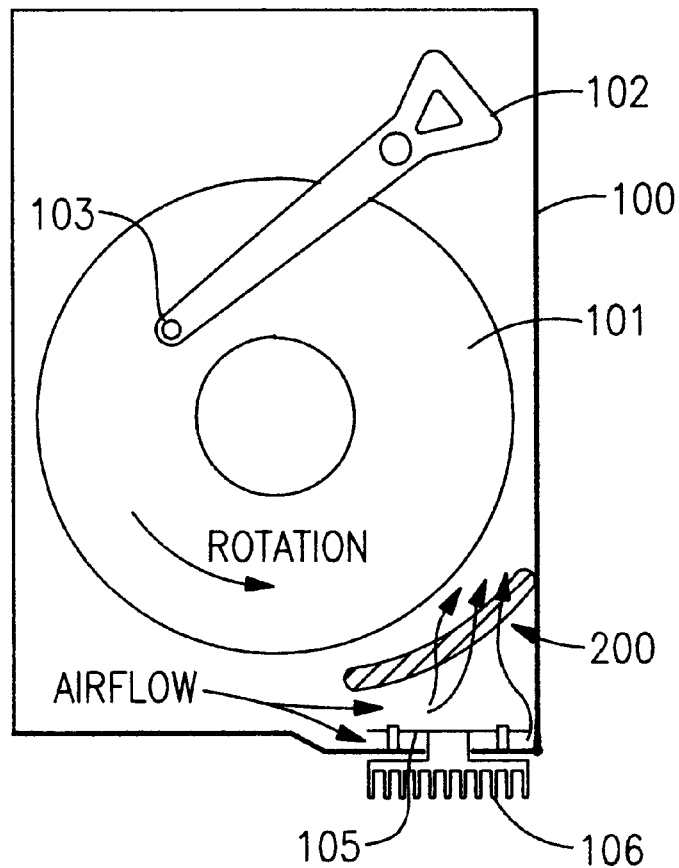
FIG. 2A illustrates a second embodiment of the invention included within a direct access storage device.

A second embodiment of the invention is illustrated in FIG. 2A. Similar items discussed above with respect to FIGS. 1A–1D are given the same reference numbers and a discussion of the same is not repeated here for the sake of brevity. FIG. 2A illustrates a combination filter/air ram 200 which performs the function of directing air flow toward the condensation plate 105 and of filtering particles, including vaporized particles, from the atmosphere within the direct access storage device.

Specifically FIG. 2A illustrates the air flow (caused by the rotation of the storage medium 101) around the condensation plate 105 and through the combination filter/air ram 200.

Figure 2B:
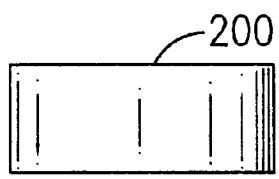
FIGS. 2B–2D illustrate different views of an inventive combination filter/air ram.
Figure 2C:
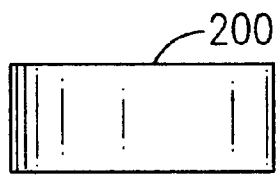
Figure 2D:
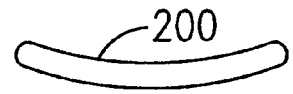

FIG. 2B illustrates the inside of the combination filter/air ram 200. FIG. 2C illustrates the disk side of the combination filter/air ram 200 and FIG. 2D illustrates a top view of the combination filter/air ram 200.

The embodiment of the invention illustrated in FIG. 1A can also preferably include a filter (not illustrated) in addition to the air ram 104. Such a filter could preferably be positioned in the path of the air flow next to the air ram to increase the efficiency of the air filter. However, by combining the air ram and filter into a single unit, the second embodiment reduces the number of parts required and therefore reduces the weight and cost of the DASD.

While the previous embodiments of the invention discuss a single condensation plate/heat transfer structure 105, 110, 106, as would be known by one ordinarily skilled in the art given this disclosure, multiple condensation plate/heat transfer structures can be utilized within a given device to achieve a desired reduction of vaporized particles, depending upon the specific application of interest.

As described above, the invention eliminates the phenomenon known as Stiction by removing vaporized molecules from internal areas of a direct access storage device (such as from the read/write head) with a condensation plate. The invention is lightweight and simple in construction and, therefore, adds little to the material and production cost of direct access storage devices. Further, because the invention utilizes passive means to cool the condensation plate, there is no need for expensive or elaborate cooling mechanisms. Additionally, the inventive thermally insulative spacers permit the passive heat sink to sufficiently cool the condensation plate so as to not require additional elements and systems to enhance passive cooling (such as elaborate channels or other devices) that are required in conventional passively cooled systems.

Therefore, because the invention insulates the passive cooling device from other structures within the direct access storage device, the passive heat transfer device for the condensation plate (e.g., heat sink 106 and thermal core 110) is more efficient and can be smaller and lighter and cost less. Further, by including an air ram which directs the flow of vaporized particles toward the condensation plate, the efficiency of the condensation plate is further increased, which allows the condensation plate/heat sink assembly to be smaller, lighter, less expensive and easier to manufacture.

While the invention has been described above with respect to a direct access storage device, the invention is equally applicable to all devices which need to reduce contamination by condensation and/or filtering. Further, those skilled in the art will recognize that the invention can be practiced with modification within the spirit and scope of the appended claims.

Having thus described our invention, what we claim as new and desire to secure by Letters Patent is as follows:

1. A storage device comprising:
    a frame;
    a condensation plate connected to said frame and positioned within said frame; and
    a passive heat transfer device connected to said condensation plate and positioned outside said frame;
    wherein said condensation plate and said passive heat transfer device are thermally insulated from said frame.

2. The storage device in claim 1, further comprising thermally insulating spacers connecting said condensation plate to said frame.

3. The storage device in claim 2, wherein said thermally insulating spacers thermally insulate said condensation plate from said frame.

4. The storage device in claim 2, wherein said thermally insulating spacers comprise one of resins, plastics, acrylics, glasses and thermally insulating ceramics.

5. The storage device in claim 1, further comprising a thermal core connecting said condensation plate to said passive heat transfer device and extending through said frame.

6. The storage device in claim 5, further comprising an insulating sealer insulating said thermal core from said frame and preventing contaminates from entering said fame.

7. The storage device in claim 5, wherein said condensation plate, said thermal core and said heat transfer device comprise thermal conductors.

8. The storage device in claim 5, wherein said condensation plate, said thermal core and said heat transfer device comprise one of aluminum, copper, gold, silver and thermally conductive ceramics.

9. The storage device in claim 1, further comprising:
   a rotating magnetic storage structure positioned within said frame generating air flow within said frame; and
   an air ram for directing said air flow toward said condensation plate.

10. The storage device in claim 9, where the air ram comprises a filter.

11. The storage device in claim 1, wherein said condensation plate has a temperature lower than that of other structures within said frame, such that contamination particles within said frame condensate on said condensation plate.

12. The storage device in claim 11, further comprising:
   a rotating magnetic storage structure positioned within said frame generating air flow within said frame; and
   at least one head writing and reading to and from said rotating magnetic storage structure,
   wherein said contamination particles are prevented from accumulating upon said rotating magnetic storage structure and said at least one head by said condensation plate condensing said contamination particles.

13. The storage device in claim 1, wherein said heat transfer device comprises a heat sink having cooling fins.

14. A direct access storage device comprising:
   a frame;
   a rotating magnetic storage structure positioned within said frame generating air flow within said frame;
   at least one head writing and reading to and from said rotating storage structure;
   thermally insulating spacers connected to said frame;
   a condensation plate connected to said thermally insulating spacers and positioned within said frame;
   a thermal core connected to said condensation plate and extending through said frame;
   a heat sink connected to said thermal core and positioned outside said frame; and
   an air ram for directing said air flow toward said condensation plate,
   wherein said condensation plate, said thermal core and said heat sink are thermally insulated from said frame.

15. The direct access storage device in claim 14, wherein said condensation plate has a temperature lower than that of other structures within said frame, such that contamination particles within said frame condensate on said condensation plate.

16. The direct access storage device in claim 14, wherein said contamination particles are prevented from accumulating upon said rotating magnetic storage structure and said at least one head by said condensation plate condensing said contamination particles.

17. The direct access storage device in claim 14, wherein said thermally insulating spacers thermally insulate said condensation plate from said frame.

18. The direct access storage device in claim 14, further comprising an insulating sealer insulating said thermal core from said frame and preventing contaminates from entering said fame.

19. The direct access storage device in claim 14, wherein said thermally insulating spacers comprise one of resins, plastics, acrylics, glasses and thermally insulating ceramics.

20. The direct access storage device in claim 14, wherein said condensation plate, said thermal core and said heat sink comprise thermal conductors.

21. The direct access storage device in claim 14, wherein said condensation plate, said thermal core and said heat sink comprise one of aluminum, copper, gold, silver and thermally conductive ceramics.

22. The direct access storage device in claim 14, wherein said heat sink includes cooling fins.

23. The direct access storage device in claim 14, wherein said air ram comprises a filter.

24. A structure for reducing latent thermal vaporization comprising:
   a condensation plate positioned within a frame;
   a passive heat transfer device connected to said condensation plate and positioned outside said frame,
   wherein said condensation plate and said passive heat transfer device are thermally insulated from said frame, and
   a thermal core connecting said condensation plate to said passive heat transfer device and extending through said frame.

25. The structure in claim 24, further comprising thermally insulating spacers connecting said condensation plate to said frame.

26. The structure in claim 25, wherein said thermally insulating spacers thermally insulate said condensation plate from said frame.

27. The structure in claim 25, wherein said thermally insulating spacers comprise one of resins, plastics, acrylics, glasses and thermally insulating ceramics.

28. The structure in claim 24, further comprising an insulating sealer insulating said thermal core from said frame and preventing contaminates from entering said fame.

29. The structure in claim 24, wherein said condensation plate, said thermal core and said heat transfer device comprise thermal conductors.

30. The structure in claim 24, wherein said condensation plate, said thermal core and said heat transfer device comprise one of aluminum, copper, gold, silver and thermally conductive ceramics.

31. The structure in claim 24, wherein said frame includes a device generating air flow within said frame and said structure further comprises an air ram for directing said air flow toward said condensation plate.

32. The structure in claim 24, wherein said condensation plate has a temperature lower than that of other structures within said frame, such that contamination particles within said frame condensate on said condensation plate.

33. The structure in claim 32, wherein said contamination particles are prevented from accumulating upon devices within said frame by said condensation plate condensing said contamination particles.

34. The structure in claim 24, wherein said heat transfer device comprises a heat sink having cooling fins.

* * * * *